US011467736B1

(12) United States Patent
Nipunage et al.

(10) Patent No.: US 11,467,736 B1
(45) Date of Patent: Oct. 11, 2022

(54) DROPPED WRITE DETECTION AND CORRECTION

(71) Applicant: Pavilion Data Systems, Inc., San Jose, CA (US)

(72) Inventors: Vaibhav Nipunage, Dublin, CA (US); Unmesh Rathi, Sunnyvale, CA (US); Sundar Kanthadai, Fremont, CA (US); Sandeep Dhavale, Sunnyvale, CA (US)

(73) Assignee: Pavillon Data Systems, Inc., San Jose, CA (US)

( * ) Notice: Subject to any disclaimer, the term of this patent is extended or adjusted under 35 U.S.C. 154(b) by 0 days.

(21) Appl. No.: 17/020,679

(22) Filed: Sep. 14, 2020

(51) Int. Cl.
| G06F 12/00 | (2006.01) |
| G06F 3/06 | (2006.01) |
| G06F 9/54 | (2006.01) |
| G06F 9/32 | (2018.01) |

(52) U.S. Cl.
CPC ............ G06F 3/0619 (2013.01); G06F 3/065 (2013.01); G06F 3/067 (2013.01); G06F 3/0653 (2013.01); G06F 3/0659 (2013.01); G06F 3/0689 (2013.01); G06F 9/321 (2013.01); G06F 9/542 (2013.01)

(58) Field of Classification Search
CPC .... G06F 3/0619; G06F 3/0653; G06F 3/0659; G06F 9/321; G06F 9/542; G06F 3/067; G06F 3/0689; G06F 3/065
See application file for complete search history.

(56) References Cited

U.S. PATENT DOCUMENTS

| 7,827,441 | B1* | 11/2010 | Wenzel | G06F 11/1076 |
| | | | | 711/131 |
| 8,595,595 | B1 | 11/2013 | Grcanac et al. | |
| 2004/0034817 | A1* | 2/2004 | Talagala | G11B 20/1803 |
| | | | | 714/42 |
| 2006/0200497 | A1* | 9/2006 | Hu | G06F 11/1471 |
| 2007/0101182 | A1* | 5/2007 | Takahashi | G06F 11/0763 |
| | | | | 714/E11.006 |
| 2008/0282105 | A1* | 11/2008 | Deenadhayalan | G06F 11/1076 |
| | | | | 714/6.12 |
| 2015/0205652 | A1 | 7/2015 | Noguchi | |

\* cited by examiner

*Primary Examiner* — Jason W Blust
(74) *Attorney, Agent, or Firm* — Lowenstein Sandler LLP

(57) ABSTRACT

Implementations for dropped write detection and correction are described. An example method includes receiving a write command comprising data and associated metadata; increasing a value of a monotonic counter; generating updated metadata by adding the counter value to the metadata; atomically writing (a) the data and a first instance of the updated metadata to a first storage device, and (b) a second instance of the updated metadata to a second storage device; receiving a read request for the data; reading the first instance of the updated metadata from the first storage device; reading the second instance of the updated metadata from a second storage device; comparing the instances of metadata and the counter values within each instance of metadata; determining whether the first counter value matches the second counter value; and determining whether a dropped write has occurred based on whether the first counter values matches the second counter value.

18 Claims, 8 Drawing Sheets

DROPPED WRITE DETECTION AND CORRECTION

FIELD OF TECHNOLOGY

This disclosure relates generally to the field of data storage and in particular to dropped write detection and correction for mirrored devices on media that support extended metadata.

BACKGROUND

In a complex storage system, data integrity is imperative. Data integrity includes maintaining the accuracy and consistency of data storage in a storage system. Various data integrity techniques exist to ensure data is recorded and retrieved as intended, thus avoiding unintentional changes in the stored data. However, existing data integrity techniques are generally unable to detect dropped writes.

BRIEF DESCRIPTION OF THE DRAWINGS

The embodiments described herein will be understood more fully from the detailed description given below and from the accompanying drawings.

DETAILED DESCRIPTION

Figure 1:
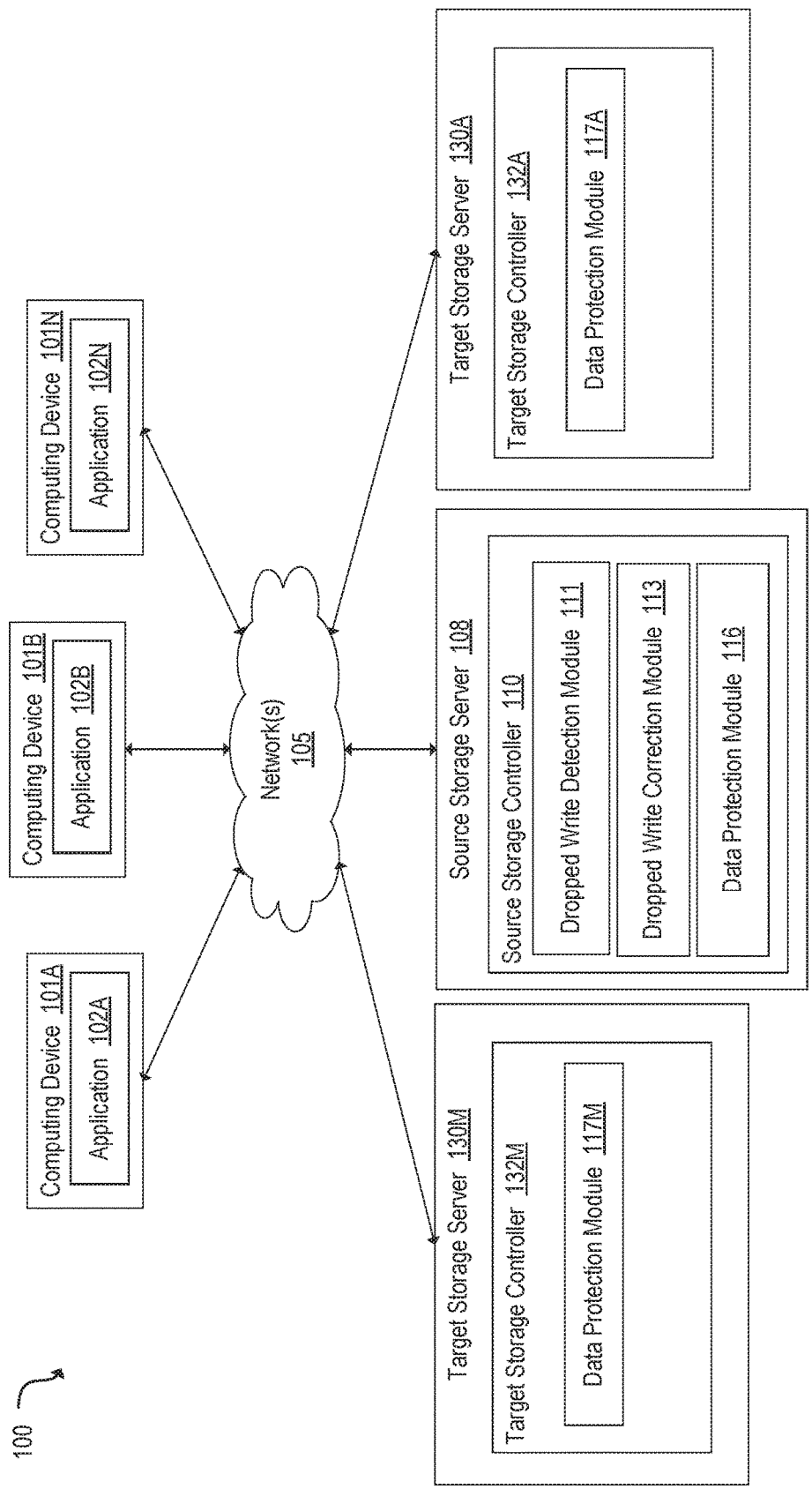
FIG. 1 is a block diagram example of a network architecture, in which embodiments described herein can operate.

Described herein are systems and methods that enable and implement dropped write detection and correction. Data integrity techniques are essential to the reliability of a data storage system. Data integrity techniques ensure the stability, consistency, and accuracy of data within a storage system. To help achieve data integrity, data storage systems often include a source storage system and one or more target storage systems. Each storage system can include one or more storage volumes. The source storage system receives data from a client or a host system, and the target storage system can serve as a backup copy of the source. The source storage system and the target storage system can be mirrored such that the source storage system is replicated onto the target storage system to ensure continuous availability of the data. Alternatively or additionally, the storage volumes can be structured as a redundant array of independent disks (RAID), which can provide data redundancy and/or parity.

In a mirror relationship, both the source and target storage systems store data as well as the corresponding metadata received from the host system. Metadata is generally data that describes other data, e.g., the metadata can associate a file name with one or more storage volume locations in which the content of the file (i.e. the data) is stored. Maintaining the transactional persistency of metadata can help ensure that the integrity of data is maintained. Conventional systems provide data and metadata mirroring so that both data and metadata can be recovered in the event of a storage volume failure. However, data integrity can be compromised even when there is no storage volume failure. For example, a write command from the host system containing both metadata and data may not be stored on the persistent storage device, even though an acknowledgment of success was relayed back to the host system. This phenomenon can be referred to as a dropped write. Dropped writes can occur due to bugs in software or flash translational layer (FLT) failures, for example. Conventional systems may not be equipped to detect and correct dropped writes. In conventional systems, since a volume failure has not occurred and an acknowledgment of successful write execution was transmitted, the dropped write can result in data corruption and restoration difficulties.

Aspects of the disclosure address the above-noted and other deficiencies by providing methods and system that enable dropped write detection and correction. A source storage system can receive a write command from a host system. The write command can include both data and metadata. In some implementations, the source storage system can add an updated monotonically increasing counter value to the metadata of the write command. Alternatively or additionally, the source storage system can add the monotonically increasing counter value to an extended portion of the metadata. In one embodiment, the data and its associated metadata, which can include the extended portion of the metadata, can then be mirrored from the source storage system to the one or more target storage systems.

The source storage system can also receive a read request from the host system. The source storage system can read the metadata that it has stored, as well as the metadata on each of the mirrored target storage volumes. The source storage system can then compare the counter values included in the metadata of the source and each of target storage volumes. The counter value can be in the metadata itself, or it can be stored in an extended portion of the data that stores metadata, which can be referred to as extended metadata. The source storage system can determine whether a dropped write has occurred based on whether or not the counter values from the source storage volume and the counter values from each of the target storage volumes match. A dropped write has occurred if the counter values do not match.

In some implementations, the source storage system can assign a universally unique identifier (UUID) to each piece of metadata when it is created. Upon receiving a read request, the source storage system can identify the UUID associated with the metadata. The source storage system can compare the UUID of the metadata read from the source storage volume as well as from the metadata read from each target storage volume in order to determine whether the metadata has become corrupted. If the UUIDs do not match, the source storage system can determine that the metadata has become corrupted. The source storage system can determine a quorum or majority among the UUIDs in order to determine which instance of the metadata is correct, and can update the incorrect versions.

Upon determining that the counter values read from each instance of metadata do not match, the source storage system can determine a correct version of the metadata. Since the counter is monotonically increasing, the highest value of all the counter values represents the correct version of the metadata. The source storage volume can then transmit to the host system the data associated with the highest counter value in response to the read request, and can correct the dropped write by updating the storage volume(s) that do not match the highest counter value.

In one embodiment, the storage volumes are protected using a redundant array of independent disks (RAID). The source storage system can receive a write request from an application. The write request can include data and associated metadata describing the data. The source storage system can increase a monotonically counter value and generate updated metadata by adding an updated monotonically increasing counter value to the metadata. The source storage system can then atomically write the data and a first instance of the updated metadata to a first storage device, and a second instance of the updated metadata to a second storage device.

The source storage system can then receive a read request from the host system. The source storage system can read the first instance of the updated metadata from the first storage device, and can read the second instance of the updated metadata from the second storage device. Each instance of metadata can include a counter value. The source storage system can then compare the counter values and determine whether the counter values match. If they do match, the source storage system can determine that no dropped write has occurred. If they do not match, the source storage system can determine that a dropped write has occurred.

In some implementations, the first storage device can be a member of a redundant array of independent disks (RAID) group. In this scenario, the source storage system can write parity data associated with the data and the updated metadata to a third storage device. The source storage system can then synthetically generate a third instance of the updated metadata using the parity data and the first instance of the updated metadata, and/or using additional parity data stored on the third storage device. The third instance of the updated metadata can include a third counter value. The source storage system can then compare the third instance of the updated metadata to the first instance and the second instance, and can determine that a dropped write has occurred if the counter values do not match.

Embodiments provide the advantages of detecting and correcting dropped writes, thus preventing data corruption caused by dropped writes. One technical advantage of embodiments includes improved data integrity within mirrored storage systems, and/or within RAID-level protected storage systems. In traditional systems, dropped writes are often not detected, resulting in data corruption and restoration difficulties. A dropped write that goes undetected can escalate and create catastrophic problems in some computing systems. Aspects of the present disclosure provide useful techniques to detect and correct dropped writes, thus ensuring data integrity. Detecting and correcting a dropped write before it causes a disruption to the system can improve the functioning of a computer, for example by avoiding unnecessary and complicated data fixes.

FIG. 1 is a block diagram example of a network architecture 100, in which embodiments described herein can operate. The network architecture 100 can include one or more computing devices (e.g., computing devices 101A through 101N) connected to a source storage server 108 and one or more target storage servers (e.g., target storage server 130A through 130M). Network 105 can be a wide area network (WAN) such as the Internet, a local area network (LAN), a storage area network (SAN), or a combination thereof. The computing devices 101A-101N, source storage server 108, and/or target storage servers 130A-130M can connect to the network 105 via an Ethernet, Fibre Channel (FC), Fibre Channel over Ethernet (FCoE), serial attached small computer system interface (SAS) or serial ATA (SATA) protocol, for example. Alternatively, other protocols can be used to connect to the network 105.

Computing devices 101A-101N can be client machines that store data on source storage server 108. Computing devices 101A-101N each include a physical machine and/or a virtual machine hosted by a physical machine. The physical machine can be a rackmount server, a desktop computer, or other computing device. In one embodiment, one or more computing device 101A-101N includes a virtual machine managed and provided by a cloud service provider system. Each virtual machine offered by a cloud service provider system can be hosted on a physical machine configured as part of a cloud. Such physical machines are often located in a data center. The cloud service provider system and cloud can be provided as an infrastructure as a service (IaaS) layer.

Each computing device 101A-101N can host one or more applications 102A-102N. The applications 102A-102N can be application servers, web servers, standalone applications, and so forth. Accordingly, computing devices 101A-101N can provide services to their clients via applications 102A-102N in some embodiments.

Each computing device 101A-101N can additionally mount or otherwise connect to one or more virtual drives (not shown), e.g., one or more logical unit numbers (LUNs) or volumes and/or one or more virtual NVMe drives. Each virtual drive can be a logical storage device that maps a logical storage address space to physical storage address spaces of multiple storage devices (e.g., physical drives of source storage server 108) and/or to other local address spaces that are in turn mapped to the physical storage address spaces. Additionally, a virtual drive can map a logical storage address space to physical storage address spaces of storage devices on multiple different storage servers.

Source storage server 108 and target storage servers 130A-130M can each include multiple input/output (TO) controllers connected to multiple drives via a switch (not shown). Note that only a single controller 110, 132A-132M is shown on the source storage server 108 and target storage servers 130A-130M, respectively. However, it should be understood that in some embodiments both storage servers include multiple such controllers. The physical drives can be physical storage devices such as solid state drives (SSDs) (e.g., SAS/SATA drives, non-volatile memory express (NVMe) drives, small computer system interface (SCSI) over PCIe (SOP) drives, or solid state drives that communicate using different protocols), conventional disk drives, or any other storage media. The switch can be a multi-port bridge that connects the IO controllers within a storage server. The switch can manage the flow of data within source storage server 108 and/or target storage server 130A-130M by connecting specific IO controllers in the respective storage servers 108, 130A-130M to specific drives on a message by message basis, allowing the switch to regulate the flow of traffic. Each IO controller and each drive connected to the switch can be identified using a unique address (e.g., a unique port address) of the IO controller or drive. The switch can be a PCIe switch, an Ethernet switch, a SAS or SATA expander, a USB switch, or other type of switch.

Source storage server 108 can be a computing device that is configured and optimized to provide storage to computing devices (e.g., to computing devices 101A-101N). Source storage server 108 can be configured as a storage area network (SAN), network attached storage (NAS), or other remote storage type. Though a single storage server 108 and a single target storage server 130A-130M are shown, the computing devices 101A-101N can connect to multiple source storage servers and/or multiple target storage servers. Additionally, source storage server 108 can also function as a target storage server for some volumes, and target storage servers 120A, 130M can also function as source storage servers for some volumes. The multiple storage servers can be arranged in a cluster or other configuration. For example, a source storage server cluster and a target storage server cluster can be arranged.

As mentioned, source storage server 108 can include one or more source storage controller 110. The source storage controller 110 can manage the storage of data to storage devices on or connected to source storage server 108. Source storage server 108 and target storage server 130A-130M can communicate with each other via network 105.

Source storage controller 110 can include a dropped write detection module 111 that can detect a dropped write on the source and/or target storage volumes, and a dropped write detection module 113 that can correct a detected dropped write. Source storage control 110 can also include a data protection module 116.

Computing device 101A-101N can send a write command and/or a read request to source storage server 108 through network 105. The write command can include data and associated metadata describing the data. The source storage controller 110, through dropped write detection module 111, can generate a counter value and add the counter value to the metadata before executing the write command in order to keep track of the most up to date version of the metadata. Upon receiving a read request, the dropped write detection module 111 can detect whether a dropped write has occurred with any of the volumes, for example by comparing the counter value included in the metadata stored on each volume. The dropped write correction module 113 can correct the dropped write once the dropped write detection module 111 has detected the dropped write. The dropped write detection module 111 and the dropped write correction module 113 are further described with regards to FIG. 2 and FIG. 3.

The data protection module 116 can execute a data protection scheme, such as device mirroring and/or RAID-level protection. In some embodiments, the target storage server 130A-130M can include a target storage controller 132A-132M. Target storage controller 132A-132M can include a data protection module 117A-117M. The data protection module 117A-117M can correspond to data protection module 116 in embodiments. For example, source storage controller 110, through data protection module 116, can control the mirroring of one or more source storage volumes to one or more target storage volumes. Additionally or alternatively, data protection module 116 can execute RAID-level protection by distributing the data and metadata, as well as parity data, among several storage volumes. Additionally, or alternatively, target storage controllers 132A, 132M can also include a dropped write detection module and/or a dropped write correction module.

Figure 2:
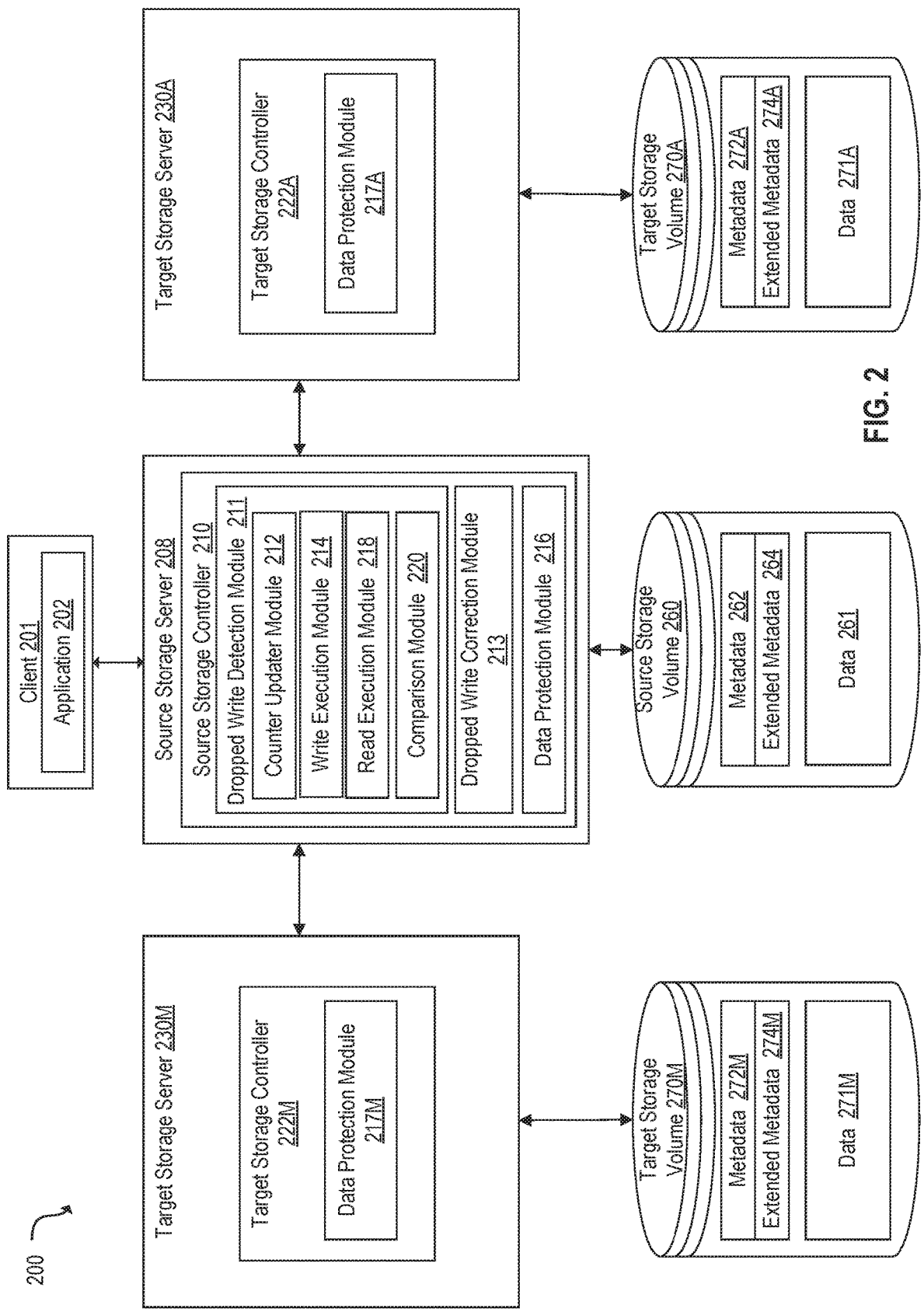
FIG. 2 is a block diagram example of a computing system architecture, in which embodiments described herein can operate.

FIG. 2 illustrates a block diagram of one embodiment of computing system architecture 200 in accordance with implementations of the disclosure. In one embodiment, source storage server 208 can implement the functions of source storage server 108 of FIG. 1, and target storage server 230A-230M can implement the functions of target storage server 130A-130M of FIG. 1.

As shown, source storage controller 210 includes dropped write detection module 211 that can detect a dropped write on the source and/or target storage volumes, dropped write correction module 213 that can correct a detected dropped write, and data protection module 216 that can execute a data protection scheme, such as mirroring and/or RAID. In order to detect a dropped write, dropped write detection module 211 can include a counter updater module 212, a write execution module 214, a read execution module 218, and a comparison module 220. Note that though dropped write detection module 211 is described as having multiple sub-modules, each of which performs a different operation of set of operations, it should be understood that separate modules are described merely for the purpose of expedience, and that the disclosure should not be construed as limited to the illustrated modules. For example, the operations of counter updater module 212, write execution module 214, read execution module 218, and comparison module 220 can be divided into further modules and/or can be combined into fewer modules. Additionally, all of the described functionality can be implemented without use of any distinct software, firmware and/or hardware modules.

Client 201, through application 202, can send a write command and/or a read request to source storage server 208. The write command can include data and associated metadata describing the data. Counter updater module 212 can update a monotonically increasing counter value responsive to receiving a write command. Alternatively or additionally, the counter updater module 212 can use a timestamp as the monotonically increasing counter value. The counter value can be used to identify the version of metadata associated with the write command. Write execution module 214 can execute the write command. This can include writing the data and associated metadata to source storage volume 260 and optionally sending write commands to target storage server 230M and/or 230A to cause at least one of them to write the data and associated metadata to target storage volume 270M or 270A.

In some implementations, source storage controller 210 cannot alter the metadata and data received in the write command. In an illustrative example, client 201 can use a filesystem as a means to organize its data by providing procedures to store, retrieve and update the data. A filesystem organizes data in an efficient manner and can be tuned to the specific characteristics of the storage system. Filesystems are responsible for organizing files and directories, and keeping track of which areas of the device belong to certain files and which are not being used. Filesystems can contain data blocks storing the actual data from an application or operating system running on the host system, as well as metadata blocks. The filesystem metadata can contain information about the design, structure and layout of the data structures used to store the actual data. Filesystem data and metadata cannot be altered by the source storage controller 210. Additionally, an application 202 executing a filesystem may not be aware that the source storage controller 210 is replicating the data and metadata on target storage servers (230A-230M).

In scenarios in which source storage controller 210 cannot alter the metadata received from application 202, write execution module 214 can add the monotonically increasing counter value to extended metadata 264. Extended metadata 264 can be additional metadata that is managed by source storage controller 210. For example, source storage controller 210 can dedicate some portion of source storage volume 260 as extended metadata 264. Hence, write execution module 214 can atomically write the metadata included in the write command to metadata 262, can atomically write the data in the write command to data 261, and can atomically write the newly updated metadata including the monotonic counter value to extended metadata 264.

In some implementations, the source storage controller 210 can alter the metadata received from application 202. In this case, the write execution module 214 can add the monotonic counter value directly to the metadata received in the write command, and write execution module 214 can atomically write the updated metadata to metadata 262. Extended metadata 264 may not be needed in this example. Write execution module 214 can atomically write the metadata 262 as well as the data 261 associated with the metadata on the source storage volume 260.

The write execution module 214 can identify a physical block address of source storage volume 260 associated with a virtual address specified in the metadata received in the write command. The write execution module 214 can store the data from the write command at the physical block address in data 261. The write execution module 214 can store the metadata in metadata 262, and/or the updated metadata in extended metadata 264. In one embodiment, the write execution module 214 can store the updated metadata and/or extended metadata on a separate storage device from the storage device on which data 261 is stored. A write of the data and associated metadata to source storage volume 260 and a write of the data and associated metadata to a target storage volume 270A, 270M can be performed atomically (e.g., via a synchronous mirror relationship between the source storage volume and the target storage volume(s) 270A, 270M). In such an instance, a successful write completion message can be returned to client 201 once the write to the source storage volume and a write to the target storage volume(s) 170A, 170M have been acknowledged. Alternatively, a write of the data and associated metadata to source storage volume 260 and a write of the data and associated metadata to a target storage volume 270A, 270M can be performed asynchronously (e.g., via an asynchronous mirror relationship between the source storage volume and the target storage volume(s) 270A, 270M). In such an instance, a successful write completion message can be returned to client 201 once the write to the source storage volume has been acknowledged.

Read execution module 218 can execute a read request received from the client 201 through application 202. Read request can include a virtual block address, which read execution module 218 can use to locate the physical block storing the data and associated metadata 262 and/or extended metadata 264 on source storage 260. Read execution module 218 can also locate the metadata 272A-272M and/or extended metadata 274A-M on the target storage volumes 270A-270M using the virtual block address. Each instance of updated metadata read by read execution module 218 can include a counter value of the monotonic counter.

Comparison module 220 can compare each instance of metadata to determine whether a dropped write has occurred. Comparison module 220 can compare the counter value included in the metadata of each volume (262, 272A-272M), and/or the counter value included in the extended metadata of each volume (264, 274A-274M). If the counter values all match, the comparison module 220 can determine that the data associated with the metadata is correct and that a dropped write has not occurred. If the counter values do not match, the comparison module 220 can determine that a dropped write has occurred. Upon determining that a dropped write has occurred, dropped write correction module 213 can determine the counter value that has the highest value, and can determine that the metadata associated with this highest counter value is the correct version. As such, dropped write correction module 213 can correct the dropped write by replacing the incorrect versions of the metadata with the correct version. That is, dropped write correction module 213 can replace the instances of metadata that do not have the highest counter value with the instance of metadata that does have the highest counter value. Furthermore, dropped write correction module 213 can replace the data associated with the instances of metadata that do not have the highest counter value with the data associated with the instance of metadata that does have the highest counter value.

In one embodiment, each instance of metadata (262, 272A-272M) can include a universally unique identifier (UUID). Comparison module 220 can compare the UUID of each instance of metadata to detect whether the metadata associated with each instance has become corrupted. If the UUID of each instance of metadata do not match, comparison module 220 can determine that the metadata has become corrupted. Comparison module 220 can determine that the correct UUID is the one that is shared amongst the most metadata instances. For example, if the UUID of two of the metadata instances match and a third does not match, comparison module 220 can determine that the instance of the two that match is correct, and can determine that the metadata associated with the instance for which the UUID does not match has become corrupted.

Additionally or alternatively, each block stored in a storage volume (260, 270A-270M) can include a UUID. Comparison module 220 can compare the UUIDs of each instance of metadata 262, 272A-272M, of each instance of extended metadata 264, 274A-274M, and/or of each data block in 261, 271A-271M corresponding to the read request. If the UUIDs do not match, comparison module 220 can determine that the block that has a UUID that does not match has become corrupted. By comparing the UUID values, the comparison module 220 can detect instances in which the updated metadata monotonic counter values match, but the data associated with the metadata is corrupted (as can happen in the case of misdirected writes, or writing incorrect data, for example). This can help avoid a variety of incidents of data corruption.

Data protection module 216 can execute a data protection scheme, such as device mirroring or RAID-level protection. In embodiments, data protection module 216 and data protection modules 217A-217M can each perform the same functionality. In one embodiment, data protection module 216 can mirror source storage system 208 with target storages systems 230A-230M such that source storage volume 260 is replicated onto target storage volumes 270A-270M. That is, data protection module 216 can atomically write the data from the write command and the updated metadata, including the newly added monotonic counter value, to one or more target storage systems. Target storage controller 222A-222M can write the data and the updated metadata to target storage volumes 270A-270M, respectively.

Figure 3:
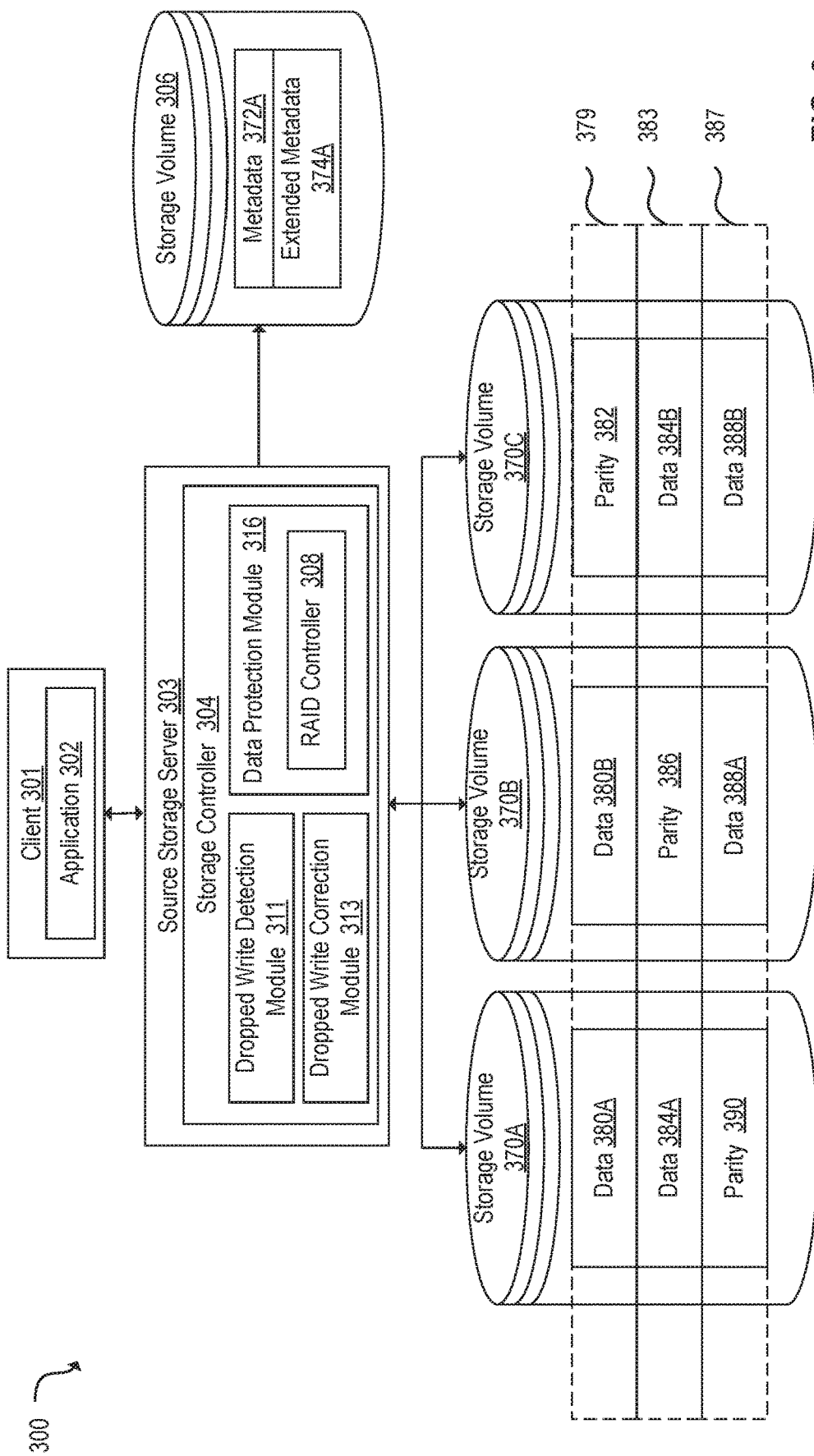
FIG. 3 is a block diagram example of a computing system architecture, in which embodiments described herein can operate.

FIG. 3 illustrates a block diagram of one embodiment of computing system architecture 300 in accordance with implementations of the disclosure. In one embodiment, source storage server 303 can implement the functions of source storage server 108 of FIG. 1, and/or source storage server 208 of FIG. 2.

As shown, source storage server 303 includes a source storage controller 304. While only a single controller 304 is shown on the source storage server 303, in some embodiments the storage server can include multiple such controllers. Source storage controller 304 can include a dropped write detection module 311, a dropped write correction module 313, and a data protection module 316. In one embodiment, dropped write detection module 311 can implement the functions of dropped write detection module 211 of FIG. 2, dropped write correction module 313 can implement the functions of dropped write correction module 213 of FIG. 2, and data protection module 316 can implement the functions of data protection module 216 of FIG. 2. Although not shown in FIG. 3, dropped write detection module 311 can include a counter updater module, a write execution module, a read execution module, and/or a comparison module, as depicted in FIG. 2.

Source storage server 303 can receive a write command and/or a read request from client 301 through application 302. Storage controller 304 can control the storage of data received from client 301. Upon receiving a write command including data and associated metadata describing the data, dropped write detection module 311 can update a monotonic counter value and add the monotonic counter value to the metadata received in a write command from application 302. In one embodiment, the dropped write detection module 311 can add the counter value to an extended portion of the metadata. Storage controller 304 can then store the data and metadata received from the write command, including the updated metadata. The storage controller 304 can store the updated metadata, which can include the extended metadata, on a separate storage volume, storage volume 306. Storage volume 306 can be used as a data store for metadata in embodiments (e.g., as a backup for metadata), which can be used by the dropped write detection module 311 to determine whether a dropped write has occurred.

Storage volumes 370A-C can be set up as a RAID group, and storage controller 304 can include RAID controller 308 for managing the RAID group. RAID controller 308 can store the metadata, the extended metadata, and/or the data in its associated array of independent disks. In this example, RAID controller 308 can distribute the metadata, the extended metadata, and the data among storage volume 370A, storage volume 370B, and storage volume 370C. There can be fewer or more storage volumes in the RAID group.

RAID-level protection can be described as storing the same data in different places on multiple storage volumes (e.g., hard disks or solid state drives) and can include parity information to provide fault tolerance. In this example, block level striping can be performed across storage volumes 370A-370C with distributed parity across storage volumes 370A-370C. Alternatively, one or more dedicated parity volumes can be used. In RAID-level data protection schemes, upon failure of a storage volume, data can be regenerated using the distributed parity information along with the distributed data from uncorrupted volumes.

As shown in FIG. 3, each storage volume 370A-370C in the RAID group can include both data (380, 384, 388) and parity information (382, 386, 390). However, in other implementations, parity information may not be distributed, and can be stored on one or more dedicated parity volumes. Data can be stored in the storage volumes 370A-C in stripes 379, 383, 387, where for each stripe a body of data (e.g., data 380A, 380B) is divided into blocks and spread across the multiple storage volumes. Each stripe can include one or more parity blocks (e.g., parity 382). Data (380A, 380B, 384A, 384B, 388A, 388B) can include the metadata received from the write request, as well as the updated metadata including the updated monotonic counter value. Parity 382, 386, 390 can each contain information sufficient to reconstruct data for a stipe 379, 383, 387 from a single storage volume should that storage volume become corrupted. Only a single parity block is shown, and only three storage volumes are shown. However, there can be more than three total storage volumes in the RAID array, and more than one of those storage volumes can contain parity information.

Dropped write detection module 311 can mimic a drive failure, and use parity data (382, 386, 390) along with data (380, 384, 388) to perform synthetic regeneration to generate a new instance of the metadata to check metadata for each possible synthetic regeneration. That is, upon receiving a read request, dropped write detection module 311 can use the RAID-level protected storage system to generate a third instance (and/or one or more additional instances) of the metadata associated with the read request. For instance, a first synthetic regeneration can be performed for stripe 379 using parity 382 and data 380A, and a second synthetic regeneration can be performed for stripe 379 using parity 382 and data 380B. Additionally, the data 380A and 380B can be read directly (without a need to perform any synthetic regeneration). If there are more parity volumes, and/or mirrored volumes, then further instances of the metadata can be determined (e.g., directly or view synthetic regeneration).

Dropped write detection module 311 can then compare three or more instances of metadata to determine whether a dropped write has occurred. In an example of comparing metadata for stripe 379, a first instance of the metadata can be read directly from the data 380A, 380B; a second instance can be read from storage volume 306; a third instance can generated using the parity data 382 along with data 380A, and a fourth instance can be generated using the parity data 382 along with data 380B. Dropped write detection module 311 can compare the counter values from each instance of metadata in order to determine whether a dropped write has occurred. If the counter values from each instance of metadata match, dropped write detection module 311 can determine that a dropped has not occurred for any of the metadata 372A, data 380A, data 380B or parity 382, and that the data associated with the metadata is valid.

If the counter values from each instance of metadata do not match, dropped write detection module 311 can determine that a dropped write has occurred. If dropped write detection module 311 determines that the counter value in the second instance of metadata (counter value in metadata 372A and/or extended metadata 374A in storage volume 306) is higher than the counter value in the first instance of the metadata (i.e., the metadata storage in data 380A, 380B), and higher than the counter value in the third and fourth instances of the metadata (i.e., the synthetically regenerated metadata), the dropped write detection module 311 can notify client 301 that a dropped write has occurred in the data. In this example, the dropped write correction module 313 may not be able to correct the dropped write, as storage volume 306 may not store data associated with metadata 372A and/or extended metadata 374A.

If dropped write detection module 311 determines that the counter value in the first instance of the metadata (i.e., the metadata storage in data 380A-B) is higher than the counter value in the second instance of metadata (counter value in metadata 372A and/or extended metadata 374A in storage volume 306) and higher than the counter value in the third and/or fourth instance of the metadata (i.e., the synthetically regenerated metadata), dropped write detection module 311 can determine that a dropped write has occurred with regard to storage volume 306. Dropped write correction module 313 can correct the dropped write with regard to storage volume 306 by updating metadata 372A and extended metadata 374A with the metadata and extended metadata from data 380A-B. Dropped write correction module 313 can return the data associated with the first instance of metadata to client 301 in response to the read request.

If dropped write detection module 311 determines that the counter value in the second instance of the metadata (counter value in metadata 372A and/or extended metadata 374A in storage volume 306) is higher than the counter value in the first instance of metadata (i.e., the metadata from data 380A-B) and matches the counter value in the third instance of the metadata (i.e., the synthetically regenerated metadata), dropped write detection module 311 can determine that a dropped write has occurred in one of storage volumes 370A-370B. Dropped write correction module 313 can correct the dropped write by using the parity data 382 and data 380A to rebuild the incorrect data 380B (including associated metadata and/or extended metadata). The dropped write correction module 313 can return the corrected version of the data to the client 301 in response to the read request.

FIGS. 4-6B depict flow diagrams for illustrative examples of methods related to the detection and correction of dropped writes, in accordance with one or more aspects of the disclosure. Methods 400 through 650 can be performed by processing logic that can comprise hardware (e.g., circuitry, dedicated logic, programmable logic, microcode, etc.), executable code such as software (such as is run on a general purpose computer system or a dedicated machine), firmware, or a combination of some or all of the above. Methods 400 through 650 and each of their individual functions, routines, subroutines, or operations can be performed by one or more processors of the computer device executing the method. In certain implementations, methods 400 through 650 can each be performed by a single processing thread. Alternatively, methods 400 through 650 can be performed by two or more processing threads, each thread executing one or more individual functions, routines, subroutines, or operations of the method. In an illustrative example, the processing threads implementing methods 400 through 650 can be synchronized (e.g., using semaphores, critical sections, and/or other thread synchronization mechanisms). Alternatively, the processes implementing methods 400 through 650 can be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts can be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any non-transitory computer-readable device or medium or memory page media. In one implementation, methods 400 through 650 can be performed by source storage controller 110 and/or target storage controller 132A-132M as shown in FIG. 1.

Figure 4:
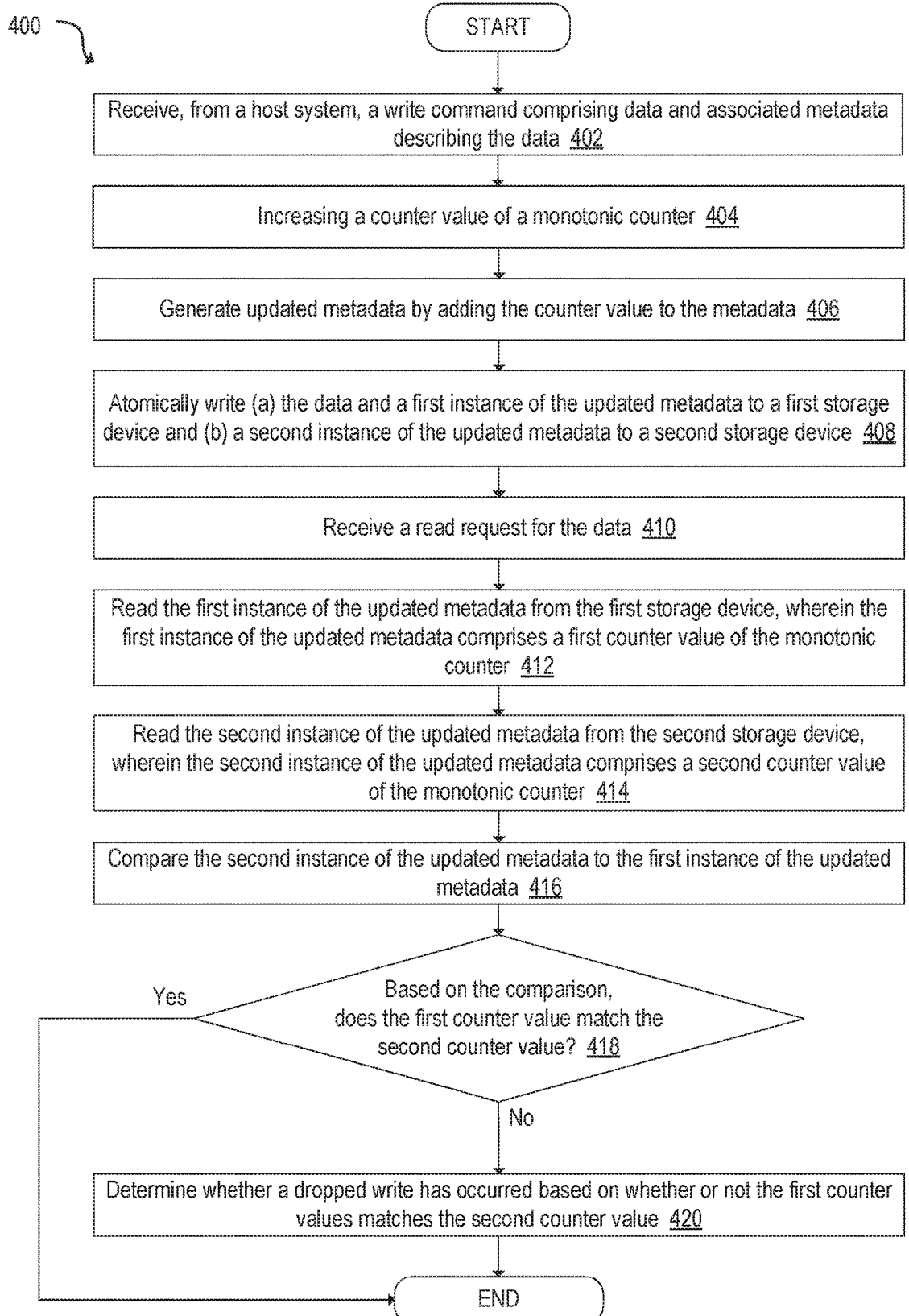
FIG. 4 is a flow diagram of one embodiment for a method to detect a dropped write.

Referring to FIG. 4, method 400 illustrates an example of an embodiment of detecting a dropped write, according to least one implementation. Method 400 can be performed by a processing device (e.g., of a controller) for a server device and can begin at block 402. At block 402, processing logic can receive, from a host system, a write command comprising data and associated metadata describing the data. The write command can be generated by an application running on the host system.

At block 404, the processing logic can increase a counter value of a monotonic counter. The counter value can be used to identify the most up-to-date instance of metadata. A monotonic counter can be described as an increasing counter, the value of which does not decrease. In some implementations, the monotonic counter can be a timestamp. Additionally, the processing logic can allow for a counter reset. That is, once the counter value has reached its maximum value, the counter can reset and the processing logic can accurately identify the most up to date counter value as being the lower number. For example, if the counter value difference between two instances of metadata exceeds some threshold and the lower counter value is a specific value (e.g., 1) or selected from a specific set of values (e.g., 1-3), then the lower counter value can be determined to be the most recent counter value.

At block 406, the processing logic can generate updated metadata by adding the counter value to the metadata. In some implementations, the processing logic can add the counter value directly to the metadata received from the host system. Alternatively or additionally, the processing logic can add the counter value to an extended portion of the metadata.

At block 408, the processing logic can atomically write (a) the data and a first instance of the updated metadata to a first storage device, and (b) a second instance of the updated metadata to a second storage device. In one embodiment, the first storage device can be a member of a redundant array of independent disks (RAID).

In one embodiment, the first storage device can be a source storage device, and the second storage device can be a target device in a mirror relationship with the first storage device. Hence, in a mirror relationship, at block 408, the processing logic can atomically write (a) the data and the updated metadata to a source volume in a mirror relationship, and (b) the data and the updated metadata to one or more target volumes in the mirror relationship. In some implementations, the processing logic can identify a physical block address of a storage device associated with the virtual block address specified in the metadata, and store the data at the physical block address. The processing logic can further store the updated metadata, which includes the counter value, on a separate storage device.

At block 410, the processing logic can receive a read request for the data. The read request can be received from an application running on the host system. In some implementations, the read request can include a logical block address that the processing logic can use to identify the physical location of the store data and its associated metadata.

At block 412, the processing logic can read the first instance of the updated metadata from the first storage device. The first instance of the updated metadata can include a first counter value of the monotonic counter. At block 414, the processing logic can read a second instance of the updated metadata from the second storage device. The second instance of the updated metadata can include a second counter value of the monotonic counter.

In the case of a mirror relationship between the storage volumes, the processing logic can read the updated metadata from the source volume and from the one or more target volumes. Each instance of the updated metadata can include the counter value. In some instances, the metadata can be read both from metadata stored together with associated data in a first volume managed by a source storage server and can be read from separately stored metadata in a second volume managed by the source storage server. Additionally, or alternatively, the metadata can be read both from metadata stored together with associated data in a first volume managed by a target storage server and can be read from separately stored metadata in a second volume managed by the target storage server. Accordingly, for two storage volumes in a mirror relationship, at least four different instances of the metadata can be read in some embodiments. In the case that data on a storage volume (e.g., a source storage volume) that includes a RAID array, multiple instances of metadata can be synthetically generated using parity information and associated data. Accordingly, even for a volume that is not mirrored, multiple instances of metadata can still be determined. If a source and target are both arranged in a RAID array, then synthetic reconstruction can be performed for both the source and target, yielding still greater numbers of instances of the metadata.

At block 416, the processing logic can compare the second instance of the updated metadata to the first instance of the updated metadata (and/or still further instances of the metadata). In the case of a mirror relationship, the processing logic can compare the counter value from each of the source volume and the one or more target volumes.

In some implementations, the counter can be reset when it reaches a maximum value. In order to ensure the counter value accurately identifies the most up-to-date metadata instance, the maximum counter value can be significantly higher than the minimum counter value (i.e., the value to which the counter is reset), such that the processing logic can determine that lower number is the more up-to-date instance of metadata. For example, the maximum counter value can be 999,999, at which point the counter value resets to 0. If the processing logic is comparing a first instance counter value of 999,999 and a second instance counter value of 2, for example, the processing logic can determine that the more up-to-date counter value is 2. Determining the contrary, (i.e. that strictly the higher number is the more up-to-date counter value and hence the metadata instance with the counter value 999,999 is correct), would suggest that there have been nearly a million dropped writes, which is most likely not the case. Hence, the processing logic can allow for a counter reset.

At block 418, the processing logic can determine, based on the comparison, whether the first counter value included in the first instance of the updated metadata matches the second value included in the second instance of the updated metadata. In the case of a mirror relationship, the processing logic can determine, based on the comparison, whether the counter values from the source volume and the counter values from the one or more target volumes match. If the counter values match, the processing logic can determine that all instances of the metadata are correct and that a dropped write did not occur.

In some embodiments, prior to block 418, the processing logic can identify a universally unique identifier (UUID) associated with each instance of metadata. At block 416, upon comparing the instances of metadata, the processing logic can also compare the UUIDs of each instance of metadata. The processing logic can determine whether the UUIDs of each instance of metadata match, and if they do not match, the processing logic can determine the correct UUID by determining the UUID that is present among a majority of the instances of metadata. For example, if the processing logic compares five instances of metadata and three of them share a common UUID, the processing logic can determine that the three that share the same UUID are valid. The processing logic can determine that the instances of metadata that do not have the correct UUID have become corrupted. The processing logic can correct the corrupted metadata versions by replacing them with the correct metadata, and can further correct the data associated with the incorrect metadata by replacing it with the data associated with the correct metadata (i.e., the metadata with the correct UUID). Once corrected, the processing logic can move onto block 418. If the processing logic determines that the UUIDs of each instance of metadata match, the processing logic can move onto block 418.

If, at block 418, the processing logic determines that the first counter value and the second counter value do not match, the processing logic can move on to block 420. Similarly, in the case of a mirror relationship, if the processing logic determined at block 418 that the counter value from the source volume and the counter value(s) from the one or more target volumes do not match, the processing logic can move on to block 420. At block 420, the processing logic can determine that a dropped write has occurred.

Figure 5:
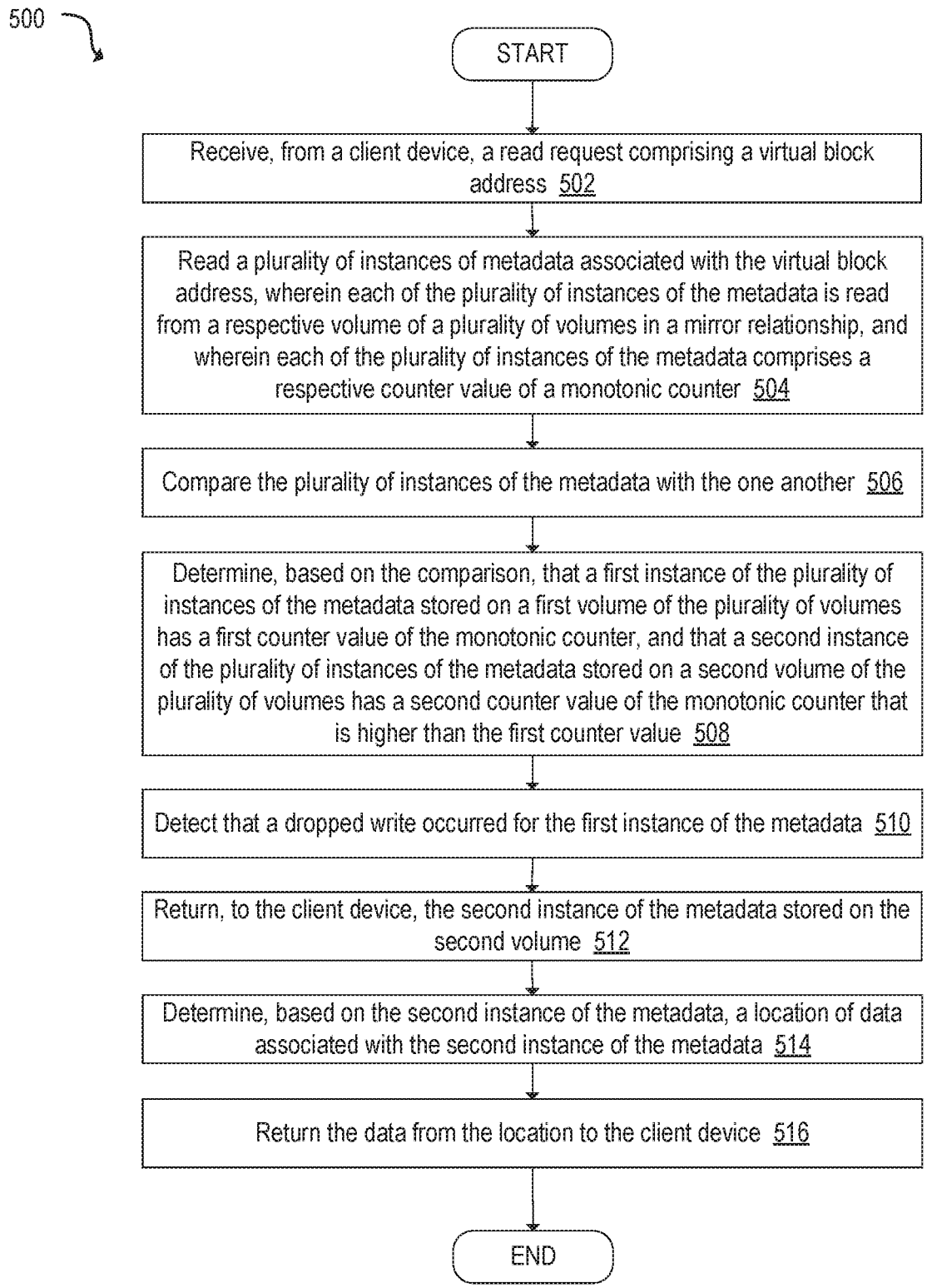
FIG. 5 is a flow diagram of another embodiment for a method to detect a dropped write.

Referring to FIG. 5, method 500 describes a method for detection of a dropped write, according to at least one implementation. Method 500 can be performed by a processing device (e.g., of a controller) for a server device and can begin at block 502.

At block 502, the processing logic can receive, from a client device, a read request comprising a virtual block address. The read request can be generated by an application running on the host system.

At block 504, the processing logic can read a plurality of instances of metadata associated with the virtual block address. Each of the plurality of instances of the metadata can be read from respective volumes of a plurality of volumes in a mirror relationship. Each of the instances of the metadata can include a counter value of a monotonic counter. In some embodiments, each instance of metadata can include a universally unique identifier (UUID).

At block 506, the processing logic can compare the plurality of instances of the metadata to each other. By comparing the instances to each other, the processing logic can identify the counter value from each instance of metadata. For example, the processing logic can identify a first instance of metadata stored on the first volume has a first counter value, and a second instance of the metadata stored on the second volume has a second counter value.

In some embodiments, at block 506, the processing logic can identify a UUID associated with each instance of metadata, and can compare the UUIDs of each instances of metadata. Upon comparing the UUIDs of each instance of metadata, processing logic can determine whether one or more instances of metadata have become corrupted. If the UUIDs of each instance of metadata match, the processing logic can move on to block 508. Alternatively, if the UUIDs of each instance of metadata dot match, the processing logic can determine the correct version of the UUID by identifying the UUID that is present in the majority of the instances of metadata. Based on this determination, the processing logic can determine that any instance of metadata that has a UUID that does not match the majority of the UUIDs has become corrupted. The processing logic can update the corrupted version(s) of the metadata, as well as update the data associated with the corrupted version(s) of the metadata, before moving on to block 508.

At block 508, the processing logic can determine, based on the comparison, that the second counter value is higher than the first counter value.

At block 510, the processing logic can determine that a dropped write has occurred for the first instance of metadata. Because the second counter value is higher than the first counter value, the processing logic can determine that the write command that resulted in the higher counter value was not successfully written to the first storage volume and hence resulted in a dropped write.

At block 512, the processing logic can return, to the client device, the second instance of the metadata stored on the second volume.

At block 514, the processing logic can determine, based on the second instance of the metadata, the location of the data associated with the second instances of the metadata. At block 516, the processing logic can return the data from the location to the client device.

Figure 6A:
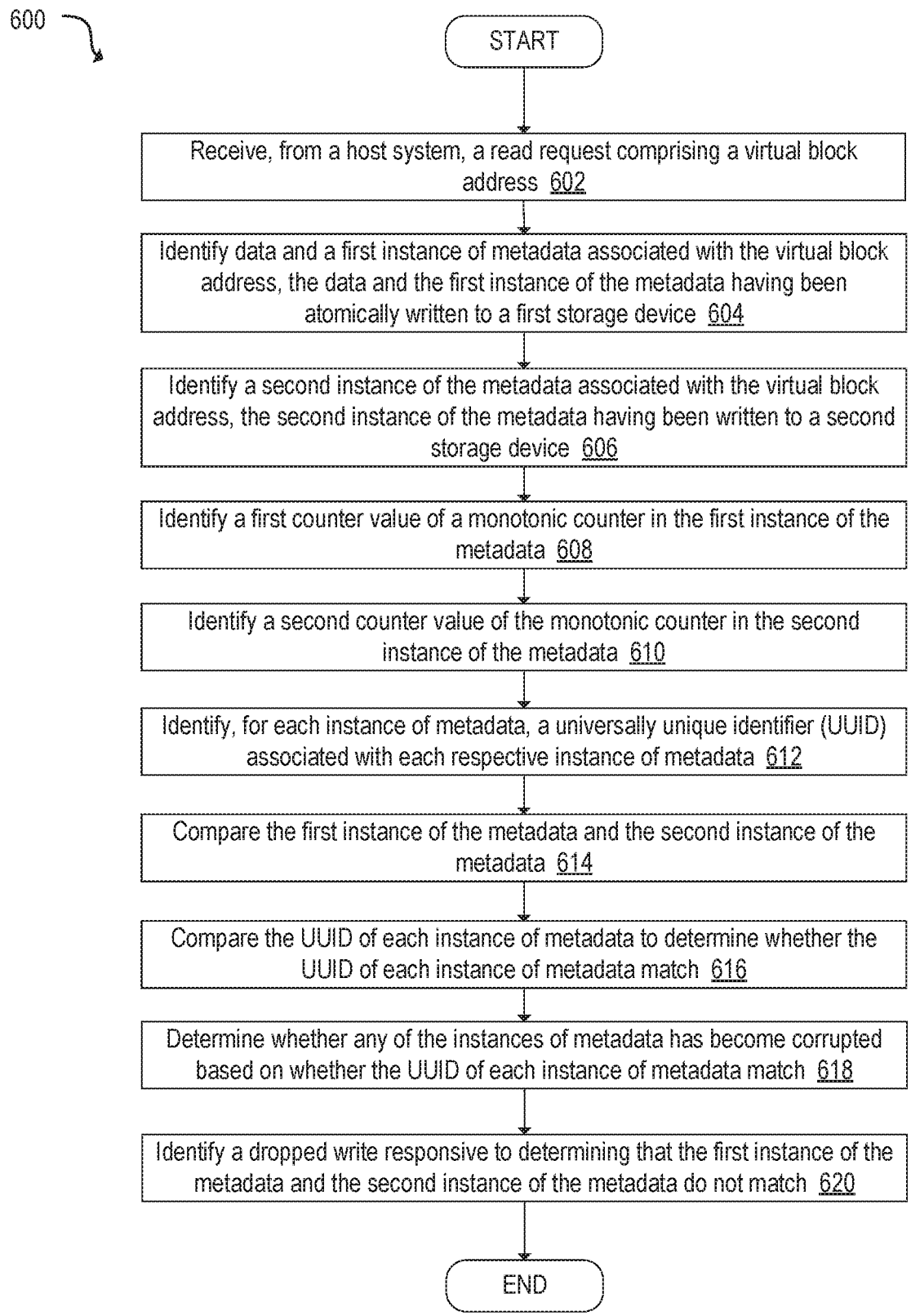
FIG. 6A is a flow diagram of another embodiment for a method to detect a dropped write.

Referring to FIG. 6A, method 600 describes a method for dropped write detection, according to at least one implementation. Method 600 can be performed by a processing device (e.g., a controller) for a server device and can begin at block 602.

At block 602, the processing logic can receive, from a host system, a read request comprising a virtual block address. The virtual block address can indicate the location of the data to be read.

At block 604, the processing logic can identify data and a first instance of metadata associated with the virtual block address, the data and the first instance of the metadata having been atomically written to a first storage device.

At block 606, the processing logic can identify a second instance of the metadata associated with the virtual block address, the second instance of the metadata having been atomically written a second storage device.

At block 608, the processing logic can identify a first counter value of a monotonic counter in the first instance of the metadata.

At block 610, the processing logic can identify a second counter of the monotonic counter in the second instance of the metadata.

At block 612, the processing logic can identify, for each instance of metadata, a universally unique identifier (UUID) associated with that instance of metadata. For example, in some embodiments, the storage system that is storing the metadata can have assigned a UUID to each piece of metadata when it was created. The processing logic can then identify the UUID of each piece of metadata upon receiving a read request.

At block 614, the processing logic can compare the first instance of the metadata and the second instance of the metadata. That is, at block 614, the processing logic can compare the first counter value included in the first instance of the metadata to the second counter value included in the second instance of the metadata.

At block 616, in certain embodiments, the processing logic can also compare the UUID of each instance of metadata to determine whether the UUID of each instance of metadata match. At block 618, the processing logic can determine whether any of the instances of metadata has become corrupted based on whether the UUID of each instance of metadata match. If the UUIDs of each instance of metadata match, the processing logic can move onto block 620. If the UUIDs of each instance of metadata do not match, the processing logic can determine a majority among the UUIDs to determine which instance of the metadata is correct. For example, if two out of three instances of metadata have a UUID that match, the processing logic can determine that the instance of metadata that has a UUID that does not match the other two instances of metadata has become corrupted. The processing logic can then correct the corrupted metadata by updating the corrupted metadata with the non-corrupted versions of the metadata. The processing logic can further update the data associated with the corrupted version of the metadata using the data associated with the non-corrupted version of the metadata.

At block 620, the processing logic can identify a dropped write based on the comparison at block 614. Responsive to determining that the first instance of the metadata and the second instance of the metadata do not match, the processing logic can determine that a dropped write has occurred.

Figure 6B:
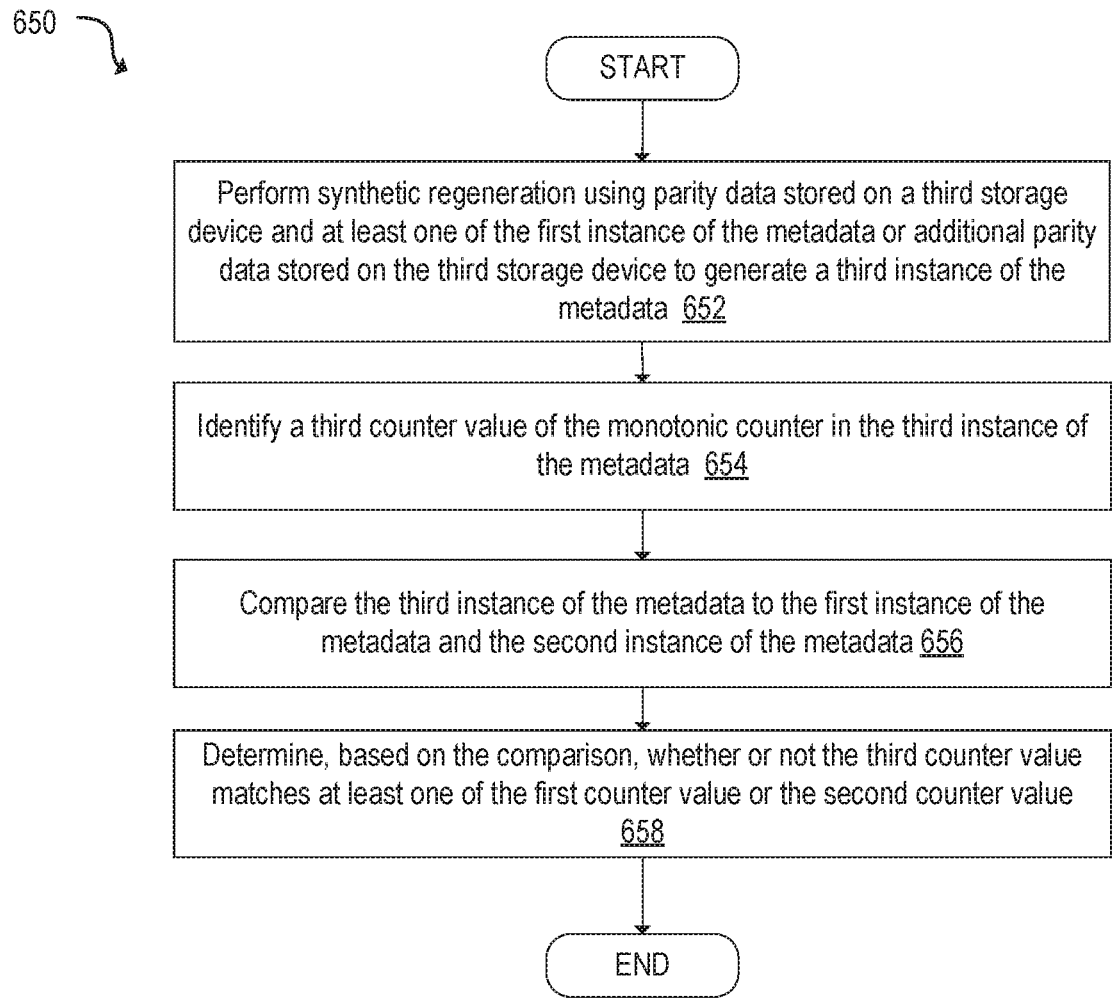
FIG. 6B is a flow diagram of one embodiment for a method to detect and correct a dropped write in a RAID group.

Referring to FIG. 6B, method 650 describes a method for dropped write detection and correction in a RAID group, according to at least one implementation. The storage volumes, or disks, on which the data are stored can be part of a RAID group, in which the multiple storage disks are combined for the purposes of data redundancy. For example, RAID 5 requires a minimum of three disks, which is depicted in method 650. However this method can be executed on a RAID 1 group, RAID 6 group, RAID 10 group, and is not limited to these examples. Hence, this method can be executed on any RAID group that uses at least 2 disks. Method 650 can be performed by a processing device for a server device and can begin at block 652.

At block 652, the processing logic can, after receiving a read request from a host system, perform synthetic regeneration using parity data stored on a third storage device and at least one of the first instance of the metadata or additional parity data stored on the third storage device to generate a third instance of the metadata. That is, in a RAID group, parity data can be stored across some or all of the storage devices, or disks, in the array. If a disk fails, a controller can use the parity data and the data on the remaining disks to reconstruct data from the failed disk. In method 650, however, the disk has not failed, and so the processing logic synthetically regenerates the data, mimicking a drive failure. For example, using parity data stored on the third storage device and at least one of the first instance of metadata and/or additional parity data stored on the third storage device, the processing logic can generate a third instance of the metadata.

At block 654, the processing logic can identify a third counter value of the monotonic counter in the third instance of the metadata. Additional instances of the metadata can also be synthetically generated depending on the number of parity volumes. At block 656, the processing logic can compare the third instance (and/or one or more additional instances) of the metadata to the first instance of the metadata and the second instance of the metadata.

In some embodiments, the comparison at block 656 can also include comparing the UUIDs of ach instance of metadata. That is, prior to block 656, the processing logic can identify a universally unique identifier (UUID) associated with the each instance of metadata. At block 656, upon comparing the instances of metadata, the processing logic can also compare the UUIDs of each instance of metadata. The processing logic can determine whether the UUIDs of each instance of metadata match, and if they do not match, the processing logic can determine the correct UUID by determining the UUID that is present among a majority of the instances of metadata. The processing logic can determine that the instances of metadata that do not have the correct UUID have become corrupted. The processing logic can correct the corrupted metadata versions by replacing them with the correct metadata, and can further correct the data associated with the incorrect metadata by replacing it with the data associated with the correct metadata (i.e., the metadata with the correct UUID). Once corrected, the processing logic can move onto block 658. If the processing logic determines that the UUIDs of each instance of metadata match, the processing logic can move onto block 658.

At block 658, based on the comparison, the processing logic can determine whether or not the third counter value matches at least one of the first counter value or the second counter value. A few scenarios can result from this determination. For example, the processing logic can determine that the second counter value from the second instance of the metadata is higher than both the first counter value from the first instance of the metadata and the third counter value from the third instance of the metadata. In this scenario, the processing logic can notify the host system that a dropped write has occurred. Because the second storage device stores only the metadata, the processing logic cannot rebuilt the dropped write in this scenario.

As another example, the processing logic can determine that the second counter value matches the third counter value, and is higher than the first counter value. In this scenario, the processing logic can determine that a dropped write occurred with respect to the first storage device. The processing logic can correct the dropped write by replacing the first instance of the metadata with the second instance of the metadata on the first storage device, and by replacing the first instance of the data associated with the first instance of the metadata with the data associated with the third instance of the metadata. That is, the processing logic can use the parity data and/or the first instance of the data to correct the dropped write. The processing logic can return the newly generated data to the host system.

As another example, the processing logic can determine that the first counter value is higher than the second counter value and the third counter value. In this scenario, the processing logic can determine a dropped write occurred with respect to the third storage device. The processing logic can replace the second instance of the metadata with the first instance of the metadata, and can return the first instance of the data associated with the first instance of the metadata to the host system.

Figure 7:
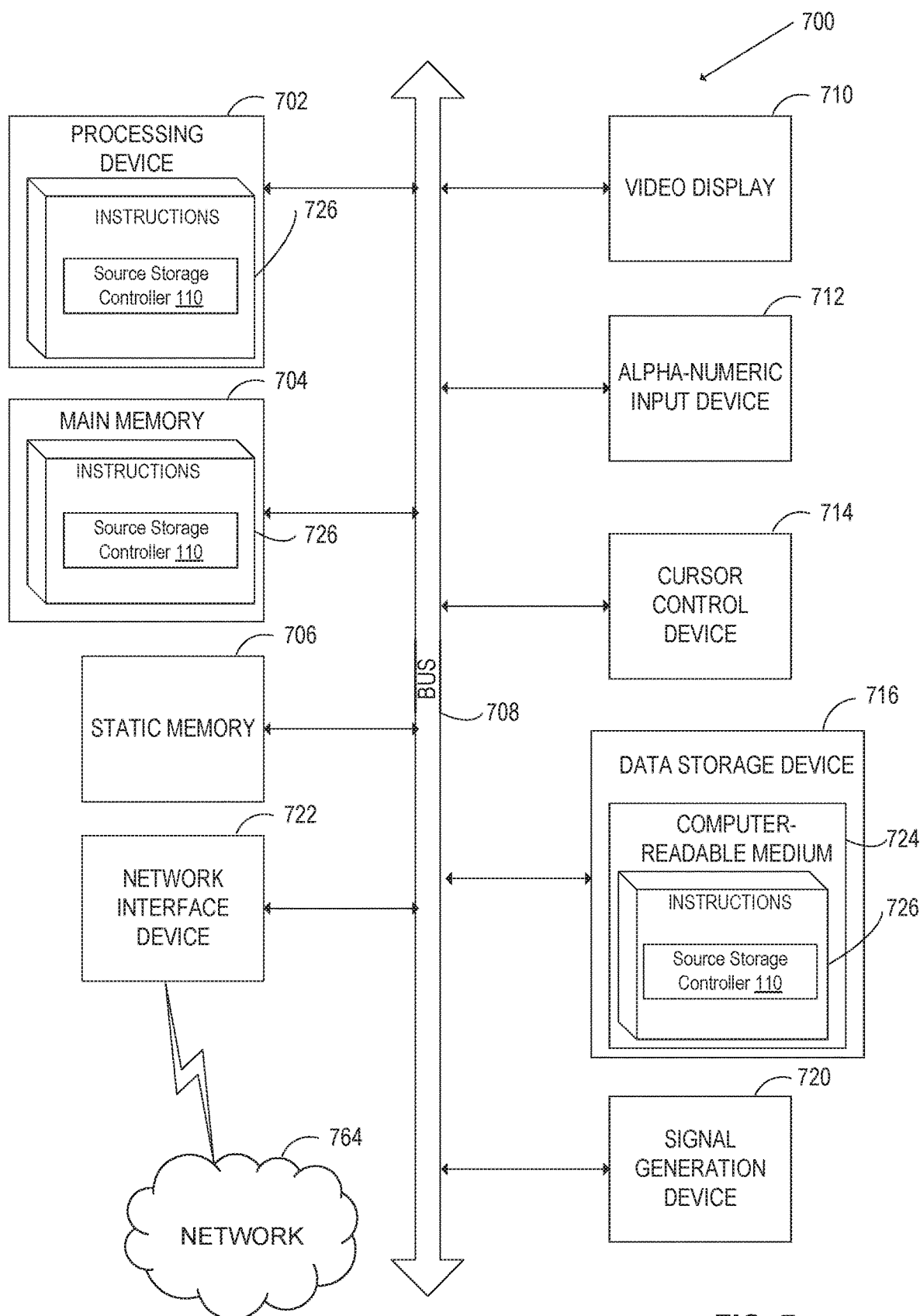
FIG. 7 illustrates an example computing device, in accordance with one embodiment.

FIG. 7 illustrates a diagrammatic representation of a machine in the example form of a computing device 700 within which a set of instructions, for causing the machine to perform any one or more of the methodologies discussed herein, can be executed. In various illustrative examples, computer system 700 can correspond to computer system 100 of FIG. 1.

In certain implementations, computer system 700 can be connected (e.g., via a network, such as a Local Area Network (LAN), an intranet, an extranet, or the Internet) to other computer systems. Computer system 700 can operate in the capacity of a server or a client computer in a client-server environment, or as a peer computer in a peer-to-peer or distributed network environment. Computer system 700 can be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 700 can include a processing device 702, a volatile memory 704 (e.g., random access memory (RAM)), a non-volatile memory 706 (e.g., read-only memory (ROM) or electrically-erasable programmable ROM (EEPROM)), and a data storage device 716, which can communicate with each other via a bus 708.

Processing device 702 can be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 700 can further include a network interface device 722. Computer system 700 also can include a video display unit 710 (e.g., an LCD), an alphanumeric input device 712 (e.g., a keyboard), a cursor control device 714 (e.g., a mouse), and a signal generation device 720.

Data storage device 716 can include a non-transitory computer-readable storage medium 724 on which can store instructions 726 encoding any one or more of the methods or functions described herein, including instructions for implementing methods 400-650 for source storage controller 110 (which can implement the functions of source storage controller 110 of FIG. 1 and/or source storage controller 210 of FIG. 2) and the modules illustrated in FIGS. 1, and 2.

Instructions 726 can also reside, completely or partially, within volatile memory 704 and/or within processing device 702 during execution thereof by computer system 700, hence, volatile memory 704 and processing device 702 can also constitute machine-readable storage media.

While computer-readable storage medium 724 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations can also be suitable to implement the system and methods described herein.

The methods, components, and features described herein can be implemented by discrete hardware components or can be integrated in the functionality of other hardware components such as ASICS, FPGAs, DSPs or similar devices. In addition, the methods, components, and features can be implemented by firmware modules or functional circuitry within hardware devices. Further, the methods, components, and features can be implemented in any combination of hardware devices and computer program components, or in computer programs.

Unless specifically stated otherwise, terms such as "determining," "detecting," "verifying," "evicting," "selecting," "restricting," "receiving," "updating," "providing" or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation. Furthermore, "requestor" and "initiator" are used interchangeably throughout this disclosure.

Examples described herein also relate to an apparatus for performing the methods described herein. This apparatus can be specially constructed for performing the methods described herein, or it can comprise a general purpose computer system selectively programmed by a computer program stored in the computer system. Such a computer program can be stored in a computer-readable tangible storage medium.

The methods and illustrative examples described herein are not inherently related to any particular computer or other apparatus. Various general purpose systems can be used in accordance with the teachings described herein, or it can prove convenient to construct more specialized apparatus to perform methods 400, 500, 600, and/or 650, and/or each of its individual functions, routines, subroutines, or operations. Examples of the structure for a variety of these systems are set forth in the description above.

The above description is intended to be illustrative, and not restrictive. Although the disclosure has been described with references to specific illustrative examples and implementations, it will be recognized that the disclosure is not limited to the examples and implementations described. The scope of the disclosure should be determined with reference to the following claims, along with the full scope of equivalents to which the claims are entitled.

What is claimed is:

1. A method of dropped write detection, comprising:
receiving, from a host system, a write command comprising data and associated metadata describing the data, wherein the associated metadata comprises a logical block address associated with the data;
increasing a counter value of a monotonic counter;
generating updated metadata by adding the counter value to the metadata;
atomically writing a) the data and a first instance of the updated metadata to a first storage device, b) a second instance of the updated metadata to a second storage device, and c) a third instance of the updated metadata to a third storage device, wherein none of the first storage device, the second storage device, or the third storage device is a storage device dedicated to storage of parity data, wherein the updated metadata is not stored together with parity data on any of the first storage device, the second storage device, or the third storage device, and wherein the first storage device, the second storage device, and the third storage device are not members of a redundant array of independent disks (RAID) array;
receiving a read request for the data;
reading the first instance of the updated metadata from the first storage device, wherein the first instance of the updated metadata comprises a first counter value of the monotonic counter;
reading the second instance of the updated metadata from the second storage device, wherein the second instance of the updated metadata comprises a second counter value of the monotonic counter;
reading the third instance of the updated metadata from the third storage device, wherein the third instance of the updated metadata comprises a third counter value of the monotonic counter;
comparing the second instance of the updated metadata to the first instance of the updated metadata and to the third instance of the updated metadata;
responsive to determining, based on the comparing, that the first counter value is higher than at least one of the second counter value or the third counter value, determining that a dropped write has occurred; and
returning, to the host system, the first instance of the updated metadata comprising the first counter value and the metadata associated with the data comprising the logical block address associated with the data.

2. The method of claim 1, wherein adding the counter value to the metadata includes writing the counter value to an extended portion of the metadata.

3. The method of claim 1, further comprising:
identifying a physical block address of a storage device associated with a virtual address specified in the metadata; and
storing the data at the physical block address.

4. The method claim 1, wherein the counter value comprises a time stamp.

5. A method of dropped write detection, comprising:
receiving, from a host system, a read request comprising a virtual block address;
identifying data and a first instance of metadata associated with the virtual block address, the data and the first instance of the metadata having been atomically written to a first storage device, wherein the first storage device is not dedicated to storage of parity data, and wherein the first storage device is not a member of a redundant array of independent disks (RAID) array, wherein the first instance of metadata comprises metadata describing data stored at the virtual block address, wherein the metadata comprises a file identifier associated with the read request;
identifying a second instance of the metadata associated with the virtual block address, the second instance of the metadata having been written to a second storage device, wherein the second storage device is not dedicated to storage of parity data, and wherein the second storage device is not a member of the RAID array;
identifying a third instance of the metadata associated with the virtual block address, the third instance of the metadata having been written to a third storage device, wherein the third storage device is not dedicated to storage of parity data, and wherein the third storage device is not a member of the RAID array;
identifying a first counter value of a monotonic counter in the first instance of the metadata, wherein the first instance of the metadata is not stored together with parity data on the first storage device;
identifying a second counter value of the monotonic counter in the second instance of the metadata, wherein the second instance of the metadata is not stored together with parity data on the second storage device;

identifying a third counter value of the monotonic counter in the third instance of the metadata, wherein the third instance of the metadata is not stored together with parity data on the third storage device;

comparing the first counter value and the second counter value and to the third counter value;

identifying a dropped write responsive to determining that the first counter value is higher than at least one of the second counter value or the third counter value; and returning, to the host system, the first instance of the metadata comprising the first counter value and the metadata comprising the file identifier.

6. The method of claim 5, further comprising:

responsive to determining that the second counter value is higher than the first counter value and that the second counter value is higher than the third counter value, notifying the host system that the dropped write occurred.

7. The method of claim 5, further comprising:

responsive to determining that the second counter value matches the third counter value and that the second counter value is higher than the first counter value, correcting the dropped write by replacing the first instance of the metadata with the second instance of the metadata on the first storage device;

replacing the first instance of the data associated with the first instance of the metadata with a second instance of the data associated with the third instance of the metadata; and returning the second instance of the data to the host system.

8. The method of claim 5, further comprising:

responsive to determining that the first counter value is higher than the second counter value and that the first counter value is higher than the third counter value, replacing the second instance of the metadata with the first instance of the metadata; and returning the first instance of the data associated with the first instance of the metadata to the host system.

9. The method of claim 5, further comprising:

identifying, for each instance of metadata, a universally unique identifier (UUID) associated with that instance of metadata;

comparing the UUID of each instance of metadata;

determining whether the UUID of each instance of metadata matches; and determining whether any of the instances of metadata has become corrupted based on whether the UUID of each instance of metadata matches.

10. A system comprising:

a memory; and a processing device communicably coupled to the memory to:

receive, from a host system, a write command comprising data and associated metadata describing the data, wherein the associated metadata comprises a logical block address associated with the data;

increase a counter value of a monotonic counter;

generate updated metadata by adding the counter value to the metadata;

atomically write a) the data and a first instance of the updated metadata to a first storage device, b) a second instance of the updated metadata to a second storage device, and c) a third instance of the updated metadata to a third storage device, wherein none of the first storage device, the second storage device, or the third storage device is a storage device dedicated to storage of parity data, wherein the updated metadata is not stored together with parity data on any of the first storage device, the second storage device, or the third storage device, and wherein the first storage device, the second storage device, and the third storage device are not members of a redundant array of independent disks (RAID) array;

receive a read request for the data;

read the first instance of the updated metadata from the first storage device, wherein the first instance of the updated metadata comprises a first counter value of the monotonic counter;

read the second instance of the updated metadata from the second storage device, wherein the second instance of the updated metadata comprises a second counter value of the monotonic counter;

read the third instance of the updated metadata from the third storage device, wherein the third instance of the updated metadata comprises a third counter value of the monotonic counter;

compare the second instance of the updated metadata to the first instance of the updated metadata and to the third instance of the updated metadata;

responsive to determining, based on the comparing, that the first counter value is higher than at least one of the second counter value or the third counter value, determine that a dropped write has occurred; and return, to the host system, the first instance of the updated metadata comprising the first counter value and the metadata associated with the data comprising the logical block address associated with the data.

11. The system of claim 10, wherein adding the counter value to the metadata includes writing the counter value to an extended portion of the metadata.

12. The system of claim 10, wherein the processing device is further to:

identifying a physical block address of a storage device associated with a virtual address specified in the metadata; and storing the data at the physical block address.

13. The system of claim 10, wherein the counter value comprises a time stamp.

14. A non-transitory machine-readable storage medium storing instructions that cause a processing device to:

receive, from a host system, a read request comprising a virtual block address;

identify data and a first instance of metadata associated with the virtual block address, the data and the first instance of the metadata having been atomically written to a first storage device, wherein the first storage device is not dedicated to storage of parity data, and wherein the first storage device is not a member of a redundant array of independent disks (RAID) array, wherein the first instance of metadata comprises metadata describing data stored at the virtual block address, wherein the metadata comprises a file identifier associated with the read request;

identify a second instance of the metadata associated with the virtual block address, the second instance of the metadata having been written to a second storage device, wherein the second storage device is not dedicated to storage of parity data, and wherein the second storage device is not a member of the RAID array;

identify a third instance of the metadata associated with the virtual block address, the third instance of the metadata having been written to a third storage device, wherein the third storage device is not dedicated to storage of parity data, and wherein the third storage device is not a member of the RAID array;

identify a first counter value of a monotonic counter in the first instance of the metadata, wherein the first instance of the metadata is not stored together with parity data on the first storage device;

identify a second counter value of the monotonic counter in the second instance of the metadata, wherein the second instance of the metadata is not stored together with parity data on the second storage device;

identify a third counter value of the monotonic counter in the third instance of the metadata, wherein the third instance of the metadata is not stored together with parity data on the third storage device;

compare the first counter value and the second counter value and to the third counter value;

identify a dropped write responsive to determining that the first counter value is higher than at least one of the second counter value or the third counter value; and return, to the host system, the first instance of the metadata comprising the first counter value and the metadata comprising the file identifier.

15. The non-transitory machine-readable storage medium of claim 14, wherein the processing device is further to responsive to determining that the second counter value is higher than the first counter value and that the second counter value is higher than the third counter value, notify the host system that the dropped write occurred.

16. The non-transitory machine-readable storage medium of claim 14, wherein the processing device is further to:

responsive to determining that the second counter value matches the third counter value and that the second counter value is higher than the first counter value, correct the dropped write by replacing the first instance of the metadata with the second instance of the metadata on the first storage device;

replace the first instance of the data associated with the first instance of the metadata with a second instance of the data associated with the third instance of the metadata; and return the data second instance of the data to the host system.

17. The non-transitory machine-readable storage medium of claim 14, wherein the processing device is further to:

responsive to determining that the first counter value is higher than the second counter value and that the first counter value is higher than the third counter value, replace the second instance of the metadata with the first instance of the metadata; and return the first instance of the data associated with the first instance of the metadata to the host system.

18. The non-transitory machine-readable storage medium of claim 14, wherein the processing device is further to:

identify, for each instance of metadata, a universally unique identifier (UUID) associated with that instance of metadata;

compare the UUID of each instance of metadata;

determine whether the UUID of each instance of metadata matches; and determine whether any of the instances of metadata has become corrupted based on whether the UUID of each instance of metadata matches.

* * * * *